United States Patent
Hwang et al.

(10) Patent No.: US 7,978,798 B2
(45) Date of Patent: Jul. 12, 2011

(54) SPATIAL MULTIPLEXING DETECTION APPARATUS AND METHOD IN MIMO SYSTEM

(75) Inventors: Keun-Chul Hwang, Seongnam-si (KR); Soong-Yoon Choi, Suwon-si (KR); Jae-Kwon Kim, Jeonranam-do (KR); Cheol-Woo You, Seoul (KR)

(73) Assignee: Samsung Electronics Co., Ltd (KR)

( * ) Notice: Subject to any disclaimer, the term of this patent is extended or adjusted under 35 U.S.C. 154(b) by 1335 days.

(21) Appl. No.: 11/499,164

(22) Filed: Aug. 4, 2006

(65) Prior Publication Data

US 2007/0032206 A1 Feb. 8, 2007

(30) Foreign Application Priority Data

Aug. 4, 2005 (KR) .................. 10-2005-0071239

(51) Int. Cl.
*H04B 1/10* (2006.01)
(52) U.S. Cl. ........ 375/349; 375/316; 375/340; 375/341; 375/347
(58) Field of Classification Search .................. 375/316, 375/340, 341, 347, 349
See application file for complete search history.

(56) References Cited

U.S. PATENT DOCUMENTS

| | | | | |
|---|---|---|---|---|
| 4,727,503 | A * | 2/1988 | McWhirter | 708/200 |
| 2003/0235255 | A1 | 12/2003 | Ketchum et al. | |
| 2004/0085890 | A1* | 5/2004 | Love et al. | 370/203 |
| 2005/0249302 | A1* | 11/2005 | Leshem et al. | 375/267 |
| 2006/0245348 | A1* | 11/2006 | Ojard | 370/208 |
| 2006/0251061 | A1* | 11/2006 | Kim et al. | 370/366 |
| 2007/0155433 | A1* | 7/2007 | Ito et al. | 455/562.1 |
| 2008/0108310 | A1* | 5/2008 | Tong et al. | 455/69 |
| 2009/0190683 | A1* | 7/2009 | Awater et al. | 375/262 |

FOREIGN PATENT DOCUMENTS

| | | |
|---|---|---|
| JP | 2005-176020 | 6/2005 |
| KR | 1020060045640 | 5/2006 |
| KR | 1020060058852 | 6/2006 |

(Continued)

OTHER PUBLICATIONS

Takayuki Fukatani, Ryutaroh Matsumoto, and Tomohiko Uyematsu, "Two methods for decreasing the computational complexity of the MIMO ML decoder", International Symposium on Information Theory and its Applications, ISITA 2004, dated Oct. 10-13, 2004, pp. 1507-1510.*

(Continued)

*Primary Examiner* — Chieh M Fan
*Assistant Examiner* — Siu M Lee
(74) *Attorney, Agent, or Firm* — The Farrell Law Firm, P.C.

(57) ABSTRACT

Provided are a spatial multiplexing apparatus and method in a Multiple Input Multiple Output (MIMO) system. The spatial multiplexing detection method includes estimating channels of a received signal, and sorting the estimated channels in descending order according to a scheme; generating a subsystem of a minimum unit by nulling an arbitrary channel among the sorted channels; performing a modified maximum likelihood (MML) in the subsystem of the minimum unit to calculate a number of transmission signal vectors; and calculating Euclidean distances of the number of the transmission signal vectors, and selecting a transmission signal vector having a minimum Euclidean distance. Accordingly, the receiver exhibits a performance level similar to a Maximum Likelihood (ML) and can obtain the complexity similar to successive interference cancellation (SIC).

12 Claims, 5 Drawing Sheets

FOREIGN PATENT DOCUMENTS

| WO | WO 00/39972 | 7/2000 |
|---|---|---|
| WO | WO 2004/038985 | 5/2004 |

OTHER PUBLICATIONS

Takayuki Fukatani, "Two methods fro decreasing the computational complexity of the MIMO ML decoder", ISITA 2004, Oct. 10-13, 2004.*

K.B. Letaief, "Joint Maximum Likelihood detection and interference cancellation for MIMO/OFDM systems", IEEE 0-7803-7954-3, dated 2003.*

Hiroyuki Kawai, "Perfromance of QRM-MLD employing two-=dimensional multi-slot and sub-carier aveaging channel estiamtion filter using orthogonal pilot channel for OFDCM MIMO multiplexing in multipath fading channel", Wireless 2004, dated Jul. 12-14, 2004.*

Fukatani et al., Two Methods for Decreasing the Computational Complexity of the MIMO ML Decoder, IEICE Transactions on Fundamentals of Electronics, Communications and Computer Sciences, vol. E87-A, No. 10, Oct. 2004.

Chonavel et al., Fast Adaptive Eigenvalue Decomposition: A Maximum Likelihood Approach; Signal Processing, vol. 83, No. 2, Feb. 2003.

Hiroyuki Kawai et al., Complexity-Reduced Maximum Likelihood Detection Based on Replica Candidate Selection With QR Decomposition Using Pilot-Assisted Channel Estimation and Ranking for MIMO Multiplexing Using OFCDM.

Young-Doo Kim et al., Adaptive Modulation for MIMO Systems With V-Blast Detection, vol. 2, pp. 1074-1078, 2003.

* cited by examiner

SPATIAL MULTIPLEXING DETECTION APPARATUS AND METHOD IN MIMO SYSTEM

PRIORITY

This application claims priority under 35 U.S.C. §119 to an application entitled "Apparatus and Method For Detecting Spatial Multiplexing in MIMO System" filed in the Korean Intellectual Property Office on Aug. 4, 2005 and allocated Serial No. 2005-71239, the contents of which are incorporated herein by reference.

BACKGROUND OF THE INVENTION

1. Field of the Invention

The present invention relates generally to a spatial multiplexing detection apparatus and method in a Multiple Input Multiple Output (MIMO) system, and in particular, to a spatial multiplexing detection apparatus and method in a MIMO system, that can reduce the complexity of a receiver and prevent the performance degradation.

2. Description of the Related Art

To support high quality multimedia services as well as voice services, various technologies for next generation wireless communication systems have been developed for transmitting at higher speed more data with lower error probability.

Multiple Input Multiple Output (MIMO) systems use multiple antennas at a transmitter and a receiver. Compared with systems using a single antenna, MIMO systems can increase channel capacity in proportion to the number of antennas without additional frequency allocation or additional transmission power allocation.

MIMO technologies are classified into a spatial diversity scheme, a spatial multiplexing scheme, and a combination scheme of the spatial diversity and the spatial multiplexing.

The spatial diversity scheme is to simultaneously transmit a single transmission (TX) signal through a plurality of TX antennas. Thus, the spatial diversity scheme can obtain diversity gain corresponding to the multiplication of the number of TX antennas and the number of reception (RX) antennas, improving the transmission reliability. Alternatively, the spatial multiplexing scheme simultaneously transmits data streams thereby increasing data throughput.

As described above, the spatial multiplexing scheme transmits the independent data stream through the respective TX antennas. Interference occurs between the transmitted data streams because a plurality of data streams are simultaneously transmitted through the TX antennas. Therefore, the receiver detects signals, considering the influence of interference signal, by using a spatial multiplexing detection scheme, such as a maximum likelihood, a successive interference cancellation (SIC), and a Vertical-Bell Labs Layered Space Time (V-BLAST), or detects signals after removing the interference. The interference cancellation includes but, is not limited to a Zero Forcing (ZF), and a Minimum Mean Square Error (MMSE), For purpose of explaining the spacing multiplexing detection algorithm, the MIMO system will be described herein with reference to FIG. 1.

Figure 1:
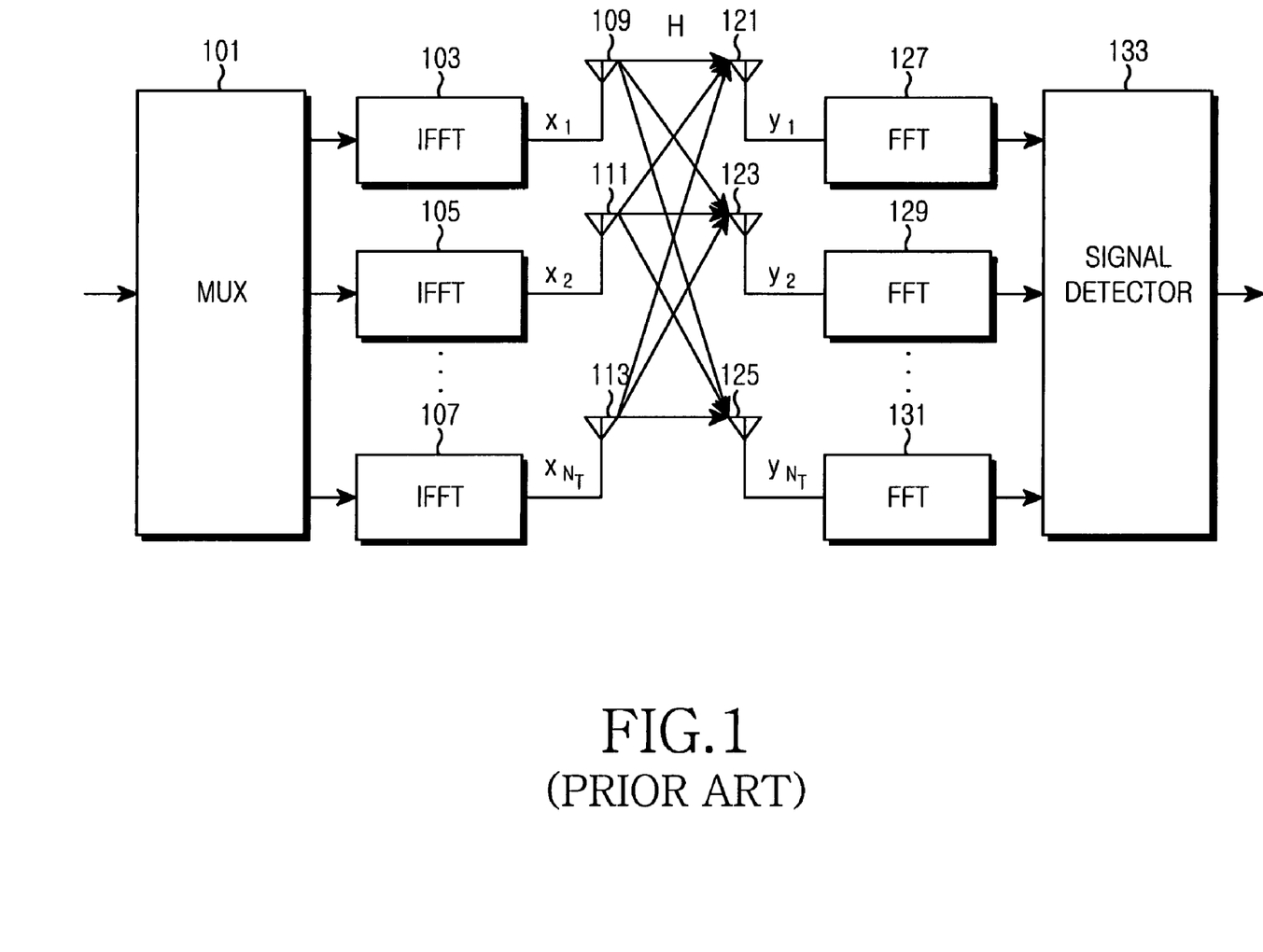
FIG. 1 is block diagram illustrating a general Multiple Input Multiple Output (MIMO) system.

FIG. 1 is a block diagram of a general MIMO system. Referring to FIG. 1, a transmitter of the MIMO system includes a Multiplexer 101, Inverse Fast Fourier Transform (IFFT) units 103, 105 and 107, and NT number of TX antennas 109, 111 and 113. A receiver of the MIMO system includes NR number of RX antennas 121, 123 and 125, Fast Fourier Transform (FFT) units 127, 129 and 131, and a Signal Detector 133.

In the transmitter, the multiplexer 101 multiplexes data streams to be transmitted to the receiver that include as many as the number of the TX antennas 109, 111 and 113. The IFFT units 103, 105 and 107 are provided at the TX antennas 109, 111 and 113, respectively. The IFFT units 103, 105 and 107 IFFT-process output signals of the multiplexer 101 to transmit the IFFT-processed signals through the TX antennas 109, 111 and 113.

In the receiver, signals are received through the RX antennas 121, 123 and 125 and are FFT-processed by the FFT units 127, 129 and 131 provided at the RX antennas 121, 123 and 125, respectively. The signal detector 133 processes the FFT-processed data streams.

The TX signal vector $x=[x_1, x_2, \ldots, x_{N_T}]^T$ is transmitted through the TX antennas 109, 111 and 113 over a channel H, and the receiver receives a signal $y=[y_1, y_2, \ldots, y_{N_R}]^T$ expressed as Equation (1) herein.

Equation (1) as expressed herein, shows the relationship of the TX signal and the RX signal in the MIMO system with NR number of RX antennas and NT number of TX antennas.

$$\begin{pmatrix} y_1 \\ y_2 \\ \vdots \\ y_{N_R} \end{pmatrix} = \begin{pmatrix} h_{1,1} & h_{1,2} & \cdots & h_{1,N_T} \\ h_{2,1} & h_{2,2} & \cdots & h_{2,N_T} \\ \vdots & \vdots & \ddots & \vdots \\ h_{N_R,1} & h_{N_R,2} & \cdots & h_{N_R,N_T} \end{pmatrix} \begin{pmatrix} x_1 \\ x_2 \\ \vdots \\ x_{N_T} \end{pmatrix} + \begin{pmatrix} n_1 \\ n_2 \\ \vdots \\ x_{N_R} \end{pmatrix} \quad (1)$$

where y is an Rx signal, H is an $N_R \times N_T$ matrix, an element $h_{ij}$ is a channel response between an $i^{th}$ RX antenna and a $j^{th}$ TX antenna, x is a TX signal transmitted through the respective TX antennas, and n is noise of the RX antennas.

Herein a conventional spatial multiplexing detection method in the MIMO system of FIG. 1 will be described.

First, applying Equation (2) below, a Maximum Likelihood (ML) receiver calculates Euclidean distance with respect to all symbol vectors existing in the channel arrangement of Equation (1). Then, the vector having the smallest Euclidean distance is selected.

Equation (2), as expressed herein is an equation for detecting the maximum likelihood.

$$\hat{x} = \underset{x}{\operatorname{argmin}} \|y - Hx\|_F^2 \quad (2)$$

Because all the symbol vectors are examined, an amount of calculation of the ML represents an amount of calculation of $M^{N_T}$. That is, the amount of calculation is exponentially proportional to the number of the TX antennas.

The SIC scheme is to remove a value detected at a previous stage from an RX signal. However, in the SIC scheme reliability of the previously detected value is lowered with the passing of each stage. Therefore, the SIC scheme needs to consider error propagation acting as a performance degradation factor. That is, due to the SIC process, the performance of a TX antenna signal having weak signal strength is not greatly improved.

The V-BLAST scheme is an improved algorithm of the SIC. The V-BLAST scheme performs the SIC process in the order of TX antenna indexes having large signal strengths. The V-BLAST schemes performance is more improved than the existing SIC scheme.

A Modified ML (MML) performs the above ML with respect to the symbol vectors transmitted from all TX antennas, except a signal transmitted from one TX antenna. The signal transmitted from single TX antenna is sliced and calculated using Equation (3) as expressed herein.

$$x_i = Q\left(\frac{h_i^H}{\|h_i\|^2}\left(y - \sum_{j(\neq i)} h_j x_j\right)\right) \quad (3)$$

where i is one TX antenna, j is the other TX antennas, $$y - \sum_{i \in \{1,2,\ldots,N_T\}/\{j\}} h_i x_{i,N_T}$$

is a removal of TX antenna signals calculated through the ML.

The MML has the same performance as the ML, and the calculation complexity is reduced to $M^{N_T-1}$.

The performance of the spatial multiplexing receiver is inversely proportional to the calculation complexity of the receiver. That is, as the calculation complexity of the receiver is lower, the performance of the receiver is improved. However, because the ML or MML has high calculation complexity, there is a need for an algorithm for reducing the amount of calculation.

SUMMARY OF THE INVENTION

An object of the present invention is to substantially solve at least the above problems and/or disadvantages and to provide at least the advantages below. Accordingly, an object of the present invention is to provide a spatial multiplexing detection apparatus in a MIMO system, which can reduce calculation complexity of a receiver.

Another object of the present invention is to provide a spatial multiplexing apparatus and method in a MIMO system that can reduce complexity using a subsystem, without degrading the performance of a receiver.

According to an aspect of the present invention, a spatial multiplexing detection apparatus in a MIMO system includes: a channel sorter for sorting estimated channels of a received signal according to a scheme; a subsystem generator for generating a subsystem of a minimum unit by nulling an arbitrary channel among the sorted channels; a Modified Maximum Likelihood (MML) calculator for performing an MML in the subsystem of the minimum unit to calculate a number of transmission signal vectors; and a transmission vector selector for selecting a transmission signal vector having a minimum Euclidean distance among the predetermined number of the calculated transmission signal vectors.

According to another aspect of the present invention, a spatial multiplexing detection method using a descending sort in a MIMO system includes: estimating channels of a received signal, and sorting the estimated channels in descending order according to a scheme; generating a subsystem of a minimum unit by nulling an arbitrary channel among the sorted channels; performing an MML in the subsystem of the minimum unit to calculate a number of transmission signal vectors; and calculating Euclidean distances of the number of the transmission signal vectors, and selecting a transmission signal vector having a minimum Euclidean distance.

According to a further aspect of the present invention, a spatial multiplexing detection method using an ascending sort in a MIMO system includes: estimating channels of a received signal, and sorting the estimated channels in ascending order according to a scheme; generating a subsystem of a minimum unit by nulling an arbitrary channel among the sorted channels; performing an MML in the subsystem of the minimum unit to calculate a number of transmission signal vectors; and calculating Euclidean distances of the number of the transmission signal vectors, and selecting a transmission signal vector having a minimum Euclidean distance.

According to a further aspect of the present invention, a spatial multiplexing detection method using both a descending sort and an ascending sort in a MIMO system includes: estimating channels of a received signal, and generating a first transmission signal vector by sorting the estimated channels in descending order according to a scheme; generating a second transmission signal vector by sorting the estimated channels in ascending order according to the scheme; and calculating Euclidean distances of the first and second transmission signal vectors, and selecting a transmission signal vector having a minimum Euclidean distance.

According to a further aspect of the present invention, a spatial multiplexing detection apparatus in a MIMO system includes: a channel sorter for sorting estimated channels of a received signal according to a scheme; an MML calculator for performing an MML on the sorted channels through slicing to calculate a number of transmission signal vectors; and a transmission vector selector for selecting a transmission signal vector having a minimum Euclidean distance among the number of the calculated transmission signal vectors.

According to still a further aspect of the present invention, a spatial multiplexing detection method in a MIMO system includes: estimating channels of a received signal, and sorting the estimated channels according to a scheme; performing an MML on the sorted channels through slicing to calculate a number of transmission signal vectors; and calculating Euclidean distances of the number of the transmission signal vectors to select a transmission signal vector having a minimum Euclidean distance.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Hereinafter, a technology for reducing calculation complexity of a spatial multiplexing receiver in a MIMO system will be described in detail. It is assumed that the MIMO system has four TX antennas and four RX antennas.

Figure 2:
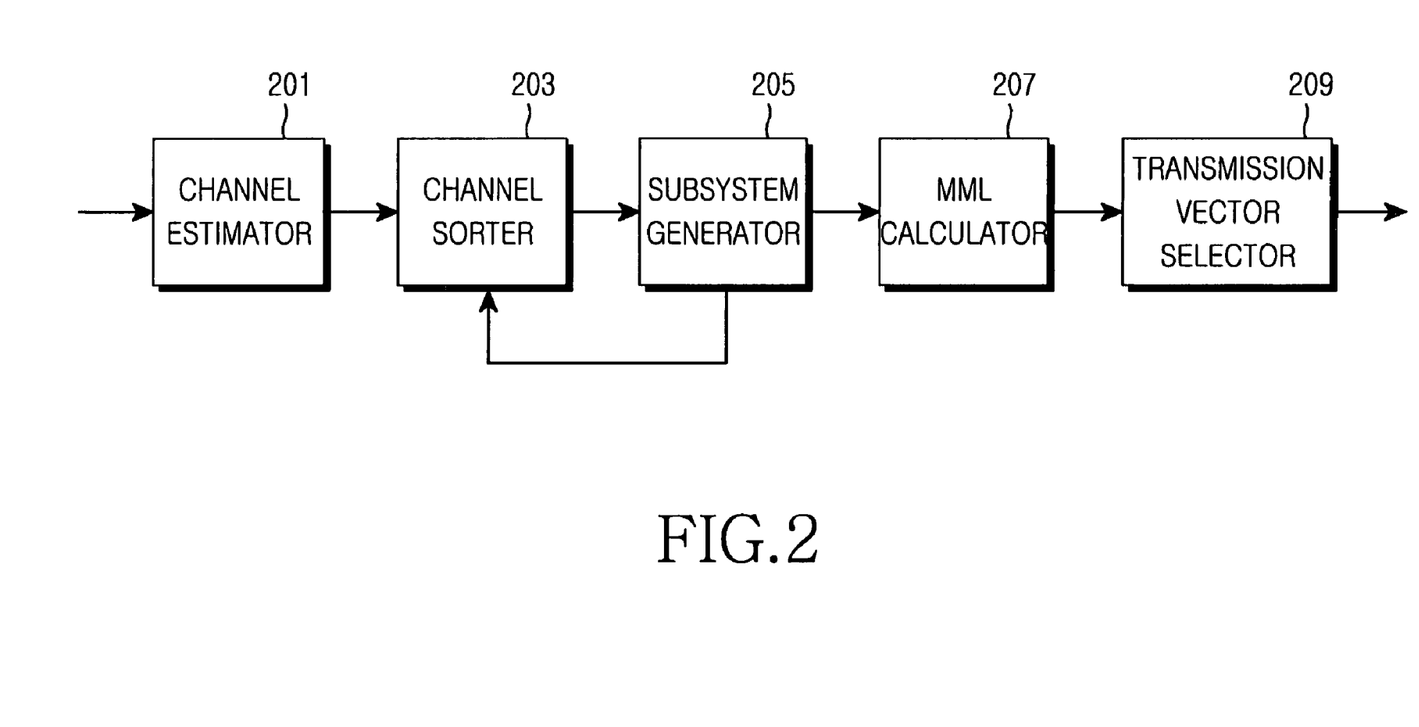
FIG. 2 is a block diagram of a Sorted Modified Maximum Likelihood (SMML) receiver according to the present invention.

FIG. 2 is a block diagram illustrating a Sorted MML (SMML) receiver according to the present invention. Referring to FIG. 2, the SMML receiver includes a channel estimator 201, a channel sorter 203, a subsystem generator 205, an MML calculator 207, and a transmission vector selector 209.

The channel estimator 201 estimates channels of signals received through RX antennas. The channel sorter 203 sorts the estimated channels according to norm of their channel vectors in either ascending or descending order. In addition, the channel sorter 203 resorts channels of a subsystem generated from the subsystem generator 205 in ascending or descending order. For example, the subsystem generator 205 receives a 4×4 system sorted according to the norm of the channel vectors and generates a 3×3 subsystem. In order to generate a 2×2 subsystem, channels of the 3×3 subsystem are provided to the channel sorter 203 and then are resorted.

The subsystem generator 205 receives the sorted channels from the channel sorter 203, and generates a subsystem through nulling by using a Given rotation vector. A detailed description of the subsystem 205 will be described later with reference to FIG. 3.

The MML calculator 207 calculates a transmission signal vector by performing an MML on a subsystem (e.g., 2×2 subsystem) finally generated by the subsystem generator 205. Then, the MML calculator 207 again performs an MML on the transmission signal vector of the subsystem to calculate transmission signal vectors of channels nulled by the subsystem generator 205. The MML calculator 207 does not determine one transmission signal vector, but calculates M-ary modulation (M) number of candidate transmission vectors according to a modulation scheme of the MIMO system. That is, when decision error occurs in the determination of one transmission signal vector, the M number of candidate transmission signal vectors is calculated so as to reduce error propagation.

The transmission vector selector 209 calculates Euclidean distances of the candidate transmission signal vectors determined by the MML calculator, and selects the transmission signal vector having the smallest Euclidean distance.

Figure 3:
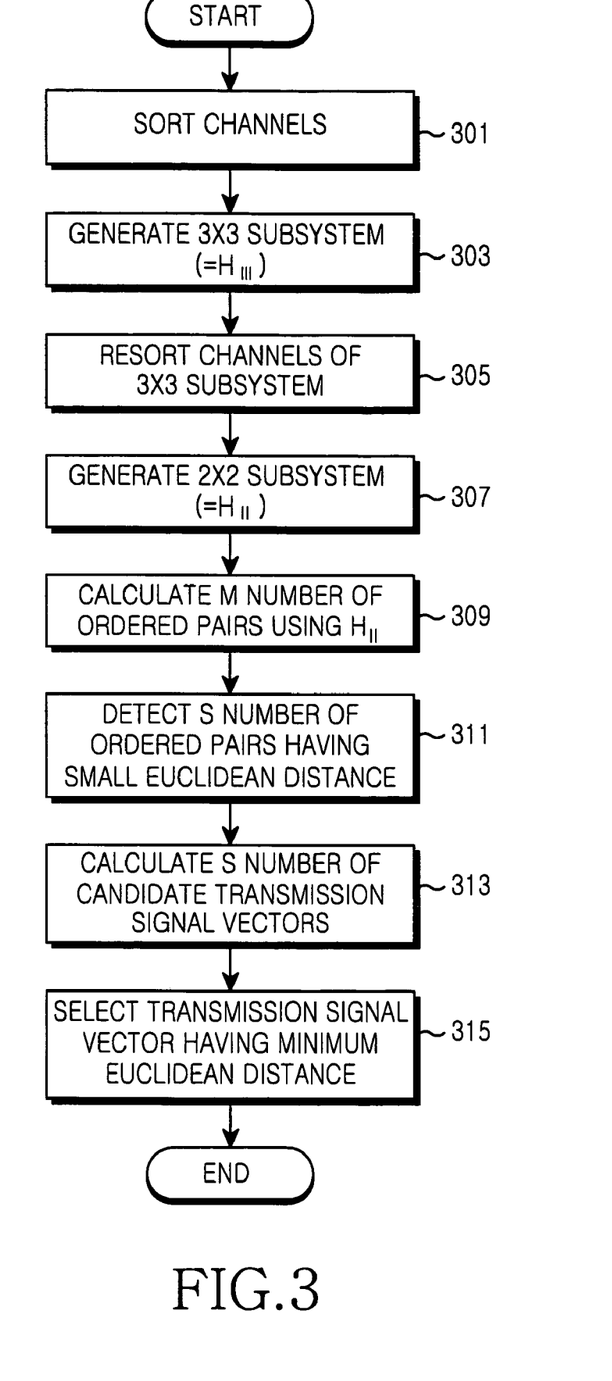
FIG. 3 is a flowchart illustrating a Sorted Modified Maximum Likelihood SMML process according to a first embodiment of the present invention.

FIG. 3 is a flowchart illustrating an SMML according to a first embodiment of the present invention. It is assumed that the channels are sorted in descending order.

Referring to FIG. 3, the receiver estimates the channels of the RX signals and sorts the estimated channels in descending order by using vector norm of the estimated channels in step 301. The channels are sorted in descending order so as to construct a 2×2 subsystem with respect to channels of two TX antennas having worst channel state and perform the MML. It is assumed that the sorting order of the channels is $h_3 > h_2 > h_4 > h_1$.

In step 303, the receiver generates a 3×3 subsystem ($H_{III}$) by nulling the channel ($h_3$)

$$h_k, k = \max_i \|h_i\|^2$$

of the TX antenna having the best channel state by using a Givens rotation.

The 3×3 subsystem is generated using Equation (4) as expressed herein.

Equation (4) is an equation for nulling the channels ($h_{4,3}$) between the fourth RX antenna and the third TX antenna in a 4×4 subsystem.

$$G_{IV,1}H_{IV} = \begin{bmatrix} h'_{1,3} & h'_{1,2} & h'_{1,4} & h'_{1,1} \\ h'_{2,3} & h'_{2,2} & h'_{2,4} & h'_{2,1} \\ h'_{3,3} & h'_{3,2} & h'_{3,4} & h'_{3,1} \\ 0 & h'_{4,2} & h'_{4,4} & h'_{4,1} \end{bmatrix} \quad (4)$$

where $$G_{IV,1} = \begin{bmatrix} 1 & 0 & 0 & 0 \\ 0 & 1 & 0 & 0 \\ 0 & 0 & c & s \\ 0 & 0 & -s^* & c \end{bmatrix},$$

$$c = \frac{|h_{3,3}|}{\sqrt{|h_{4,3}|^2 + |h_{3,3}|^2}},$$

$$s = \frac{h_{3,3} h^*_{4,3}}{|h_{3,3}|\sqrt{|h_{4,3}|^2 + |h_{3,3}|^2}},$$

and $$H_{IV} = \begin{bmatrix} h_{1,3} & h_{1,2} & h_{1,4} & h_{1,1} \\ h_{2,3} & h_{2,2} & h_{2,4} & h_{2,1} \\ h_{3,3} & h_{3,2} & h_{3,4} & h_{3,1} \\ h_{4,3} & h_{4,2} & h_{4,4} & h_{4,1} \end{bmatrix} (4 \times 4 \ MIMO \ \text{system}).$$

When $G_{IV,2}H_{IV}$ and $G_{IV,3}H_{IV}$ are sequentially performed, the result is given by Equation (5) as expressed herein:

$$G_{IV}H_{IV} = \begin{bmatrix} h'_{1,3} & h'_{1,2} & h'_{1,4} & h'_{1,1} \\ 0 & h'_{2,2} & h'_{2,4} & h'_{2,1} \\ 0 & h'_{3,2} & h'_{3,4} & h'_{3,1} \\ 0 & h'_{4,2} & h'_{4,4} & h'_{4,1} \end{bmatrix} \quad (5)$$

where $G_{IV}$ represents $G_{IV,1}G_{IV,2}G_{IV,3}$, $$G_{IV,2} = \begin{bmatrix} 1 & 0 & 0 & 0 \\ 0 & c & s & 0 \\ 0 & -s^* & c & 0 \\ 0 & 0 & 0 & 1 \end{bmatrix},$$

and $$G_{IV,3} = \begin{bmatrix} c & s & 0 & 0 \\ -s^* & c & 0 & 0 \\ 0 & 0 & 1 & 0 \\ 0 & 0 & 0 & 1 \end{bmatrix}.$$

In step 305, the receiver resorts the channels ($h'_2, h'_4, h'_1$) of the 3×3 subsystem in descending order. It is assume that the sorting order of the channels is $h'_2 > h'_1 > h'_4$.

In step 307, the receiver generates a 2×2 subsystem ($H_{II}$) by nulling the best channel ($h_2$)

$$\left(h_{III,k}, k = \max_i \|h_{III,f}\|^2\right) \quad (5)$$

among the resorted channels using Equation (4). The 2×2 subsystem is generated by $G_{III}H_{III}$, using Equation (4), and Gill represents $G_{III,1}G_{III,2}$.

In step 309, the receiver calculates M (M-ary modulation, C) number of candidate ordered pairs ($x_1$, $x_4$) with respect to the 2×2 subsystem by using MML of Equation (6).

Equation (6) as expressed herein is an equation for calculating candidate ordered pairs of the 2×2 subsystem.

$$x_4 \in C, x_1 = Q\left(\frac{h_{II,1}^H}{\|h_{II,1}\|^2}(y_{II} - h_{II,4}x_4)\right) \quad (6)$$

where $h_{II}$ represents the 2×2 subsystem generated in step 307 and, $y_{II}-h_{II,4}x_4$ represents the removal of $x_4$ from the 2×2 subsystem.

That is, M (M-ary modulation) number of $x_4$ having the worst channel state is selected using Equation (6), $x_1$ with respect to $x_4$ is calculated through slicing, and M number of candidate ordered pairs is generated.

After generating the M number of ordered pairs ($x_{1,c}$, $x_{4,c}$), the receiver calculates Euclidean distances of the ordered pairs using Equation (7) below in step 311.

Equation (7) as expressed herein is an equation for calculating Euclidean distance.

$$E_{II,c} = \left\|y_{II} - H_{II}\begin{bmatrix}x_{1,c}\\x_{4,c}\end{bmatrix}\right\|, \quad (7)$$
$$c = 1, 2, \ldots, M$$

where $H_{II}$ represents the 2×2 subsystem generated in step 307, c represents index of the candidate ordered pair.

After calculating the Euclidean distances of the ordered pairs using Equation (7), S number of ordered pairs is detected in sequence from the ordered pair having the smallest Euclidean distance. S is less than or equal to M. At this point, the S number of the ordered pairs instead of a specific ordered pair is selected so as to prevent error propagation in calculating the values of the nulled channels when decision error occurs in the case where the specific ordered pair is selected. That is, several ordered pairs are detected so as to prevent the gradual increase of the error in the 2×2 subsystem.

In step 313, channels ($x_3$, $x_2$) nulled in steps 303 and 307 are calculated by applying the S number of the detected ordered pairs to Equation (8) below.

Equation (8) as expressed herein, is an equation for calculating the channels ($x_3$, $x_2$) nulled using the MML.

$$x_{2,c} = Q\left(\frac{h_{III,2}^H}{\|h_{III,2}\|^2}\left(y_{III} - \sum_{j(i=1,4)} h_{III,i}x_{i,c}\right)\right) \quad (8)$$

-continued $$x_{3,c} = Q\left(\frac{h_{IV,3}^H}{\|h_{IV,3}\|^2}\left(y_{IV} - \sum_{j(i=1,2,4)} h_{IV,i}x_{i,c}\right)\right)$$

where $h_{III}$ represents the 3×3 subsystem generated in step 305, and $h_{IV}$ represents the 4×4 system.

That is, $x_2$ is calculated in the 3×3 subsystem through slicing, and $x_3$ is calculated in the 4×4 system. If the nulled channels ($x_3$, $x_2$) are calculated using Equation (8), a total S number of candidate transmission signal vectors are generated.

In step 315, the receiver selects the transmission signal vector having the minimum Euclidean distance by applying the S number of the candidate transmission signal vectors to Equation (9) below.

Equation (9) as expressed herein, is an equation for calculating the transmission signal vector having the minimum Euclidean distance.

$$E_{IV} = \min_{x = \{x_{1,c}, x_{2,c}, x_{3,c}, x_{4,c}\}} \|y - Hx\| \quad (9)$$

where $x_{i,c}$ represents a $c^{th}$ candidate transmission signal vector of an $i^{th}$ channel.

According to the algorithm of FIG. 3, the channels are sorted in descending order, the 2×2 subsystem is generated using channels having bad channel state, and the MML is performed. Alternatively, the channels are sorted in ascending order, the channels having bad channel state are nulled, the 2×2 subsystem is generated using channels having good channel state, and the MML is performed.

When the channels are sorted in either ascending or descending order, the symbols constructing the 2×2 subsystem can obtain ML effect, but the remaining symbols cannot obtain ML effect. Instead, the remaining symbols obtain a Maximal Ratio Combining (MRC) gain. Therefore, the ascending sort and the descending sort have to be simultaneously used so as to obtain the performance similar to the ML.

Figure 4:
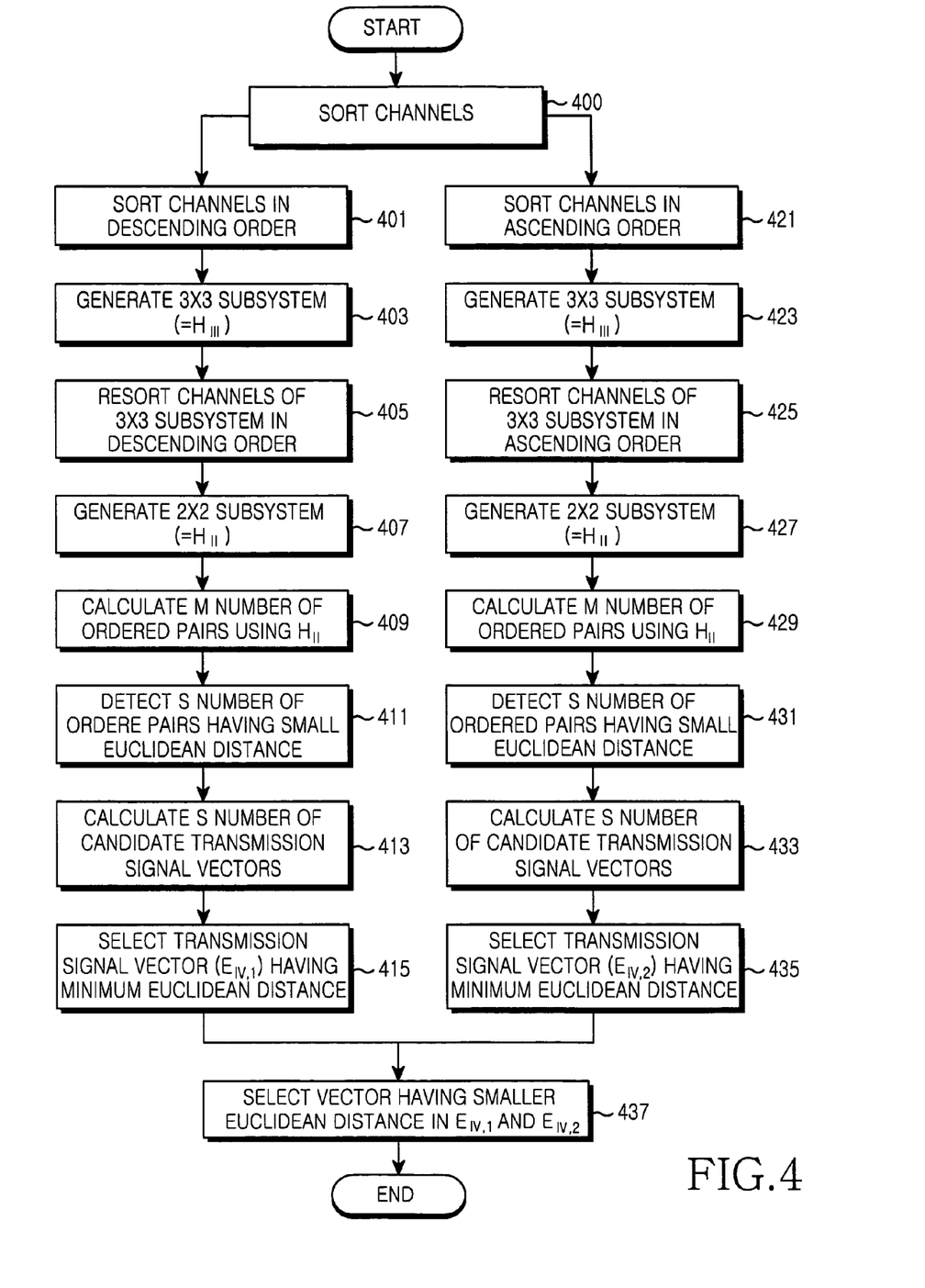
FIG. 4 is a flowchart illustrating a Sorted Modified Maximum Likelihood (SMML) process according to a second embodiment of the present invention.

FIG. 4 is a flowchart illustrating an SMML according to a second embodiment of the present invention. Referring to FIG. 4, the receiver estimates channels of RX signals and sorts the channels in descending and ascending orders using vector norm of the estimated channels in step 400.

In the case of the descending sort, the receiver sorts the estimated channels in descending order by using vector norm of the estimated channels in step 401. The channels are sorted in descending order so as to construct a 2×2 subsystem with respect to channels of two TX antennas having worst channel state and perform the MML. It is assumed that the sorting order of the channels is $h_3 > h_2 > h_4 > h_1$.

In step 403, the receiver generates a 3×3 subsystem ($H_{III}$) by nulling the channel ($h_3$)

$$h_k, k = \max_i \|h_i\|^2$$

of the TX antenna having the best channel state by using Equation (4). Since the procedure of generating the 3×3 subsystem ($H_{III}$) is identical to that of FIG. 3, a detailed description thereof will be omitted.

In step 405, the receiver resorts the channels ($h'_2$, $h'_4$, $h'_1$) of the 3×3 subsystem ($H_{III}$) in descending order. The sorting order of the channels is assumed to be $h'_2 > h'_1 > h'_4$.

In step 407, the receiver generates a 2×2 subsystem ($H_{II}$) by nulling the best channel ($h_2$)

$$\left( h_{III,k}, k = \max_i \|h_{III,f}\|^2 \right)$$

among the resorted channels using Equation (4). Since the procedure of generating the 2×2 subsystem ($H_{II}$) is identical to that of FIG. 3, a detailed description thereof will be omitted.

In step 409, the receiver calculates M (M-ary modulation, C) number of candidate ordered pairs ($x_1$, $x_4$) with respect to the 2×2 subsystem by using MML of Equation (6). That is, the M number of the channels ($x_4$) having the worst channel state is selected using Equation (6), $x_1$ with respect to $x_4$ is calculated, and M number of candidate ordered pairs is generated.

In step 411, the receiver calculates Euclidean distances of the ordered pairs using Equation (7), and detects S number of ordered pairs in sequence from the ordered pair having the smallest Euclidean distance. S is less than or equal to M. At this point, the S number of the ordered pairs instead of a specific ordered pair is selected so as to prevent error propagation in calculating the values of the nulled channels when decision error occurs in the case where the specific ordered pair is selected. That is, several ordered pairs are detected so as to prevent the gradual increase of the error in the 2×2 subsystem.

In step 413, channels ($x_3$, $x_2$) nulled in steps 403 and 407 are calculated through slicing by applying the S number of the detected ordered pairs to Equation (8). That is, a total S number of candidate transmission signal vectors are generated according to the S number of the ordered pairs detected in step 411.

In step 415, the receiver selects the transmission signal vector ($E_{IV,1}$) having the minimum Euclidean distance by applying the S number of the candidate transmission signal vectors to Equation (9).

In the case of the ascending sort, the receiver sorts the estimated channels in ascending order in step 421. The channels are sorted in ascending order so as to construct a 2×2 subsystem with respect to channels of two TX antennas having best channel state and perform the MML. It is assumed that the sorting order of the channels is $h_3 > h_2 > h_4 > h_1$.

In step 423, the receiver generates a 3×3 subsystem ($H_{III}$) by nulling the channel ($h_1$)

$$h_k, k = \max_i \|h_i\|^2$$

of the TX antenna having the worst channel state by using Equation (4). Since the procedure of generating the 3×3 subsystem ($H_{III}$) is identical to that of FIG. 3, a detailed description thereof will be omitted.

In step 425, the receiver resorts the channels ($h'_2$, $h'_4$, $h'_3$) of the 3×3 subsystem in ascending order. It is assume that the sorting order of the remaining channels is $h'_3 > h'_2 > h'_4$.

In step 427, the receiver generates a 2×2 subsystem ($H_{II}$) by nulling the worst channel ($h_4$)

$$\left( h_{III,k}, k = \max_i \|h_{III,f}\|^2 \right)$$

among the resorted channels using Equation (4). Since the procedure of generating the 2×2 subsystem ($H_{II}$) is identical to that of FIG. 3, a detailed description thereof will be omitted.

In step 429, the receiver calculates M (M-ary modulation) number of candidate ordered pairs ($x_2$, $x_3$) with respect to the 2×2 subsystem by using MML of Equation (6). That is, after the M number of the channels ($x_3$) having the best channel state is selected, $x_1$ with respect to $x_4$ is calculated and M number of candidate ordered pairs is generated.

In step 431, the receiver calculates Euclidean distances of the ordered pairs using Equation (7), and detects S number of ordered pairs in sequence from the ordered pair having the smallest Euclidean distance. S is less than or equal to M. At this point, the S number of the ordered pairs instead of a specific ordered pair is selected so as to prevent error propagation in calculating the values of the nulled channels when decision error occurs in the case where the specific ordered pair is selected. That is, several ordered pairs are detected so as to prevent the gradual increase of the error in the 2×2 subsystem.

In step 433, channels ($x_1$, $x_4$) nulled in steps 423 and 427 are calculated through slicing by applying the S number of the detected ordered pairs to Equation (8). That is, a total S number of candidate transmission signal vectors are generated according to the S number of the ordered pairs detected in step 431.

In step 435, the receiver selects the transmission signal vector ($E_{IV,2}$) having the minimum Euclidean distance by applying the S number of the candidate transmission signal vectors to Equation (9).

In step 437, using Equation (10) as set forth; the receiver selects the transmission signal vector having the smaller Euclidean distance in the transmission signal vector selected through the descending sort in step 415 and the transmission signal vector selected through the ascending sort in step 435.

Equation (10), as expressed herein, is an equation for selecting a transmission signal vector having the smallest Euclidean distance.

$$x\char`\^ \text{ with } \min\{E_{IV,1}, E_{IV,2}\} \qquad (10)$$

where $E_{IV,1}$ represents the transmission signal vector calculated through the descending sort, and $E_{IV,2}$ represents the transmission signal vector calculated through the ascending sort.

Figure 5:
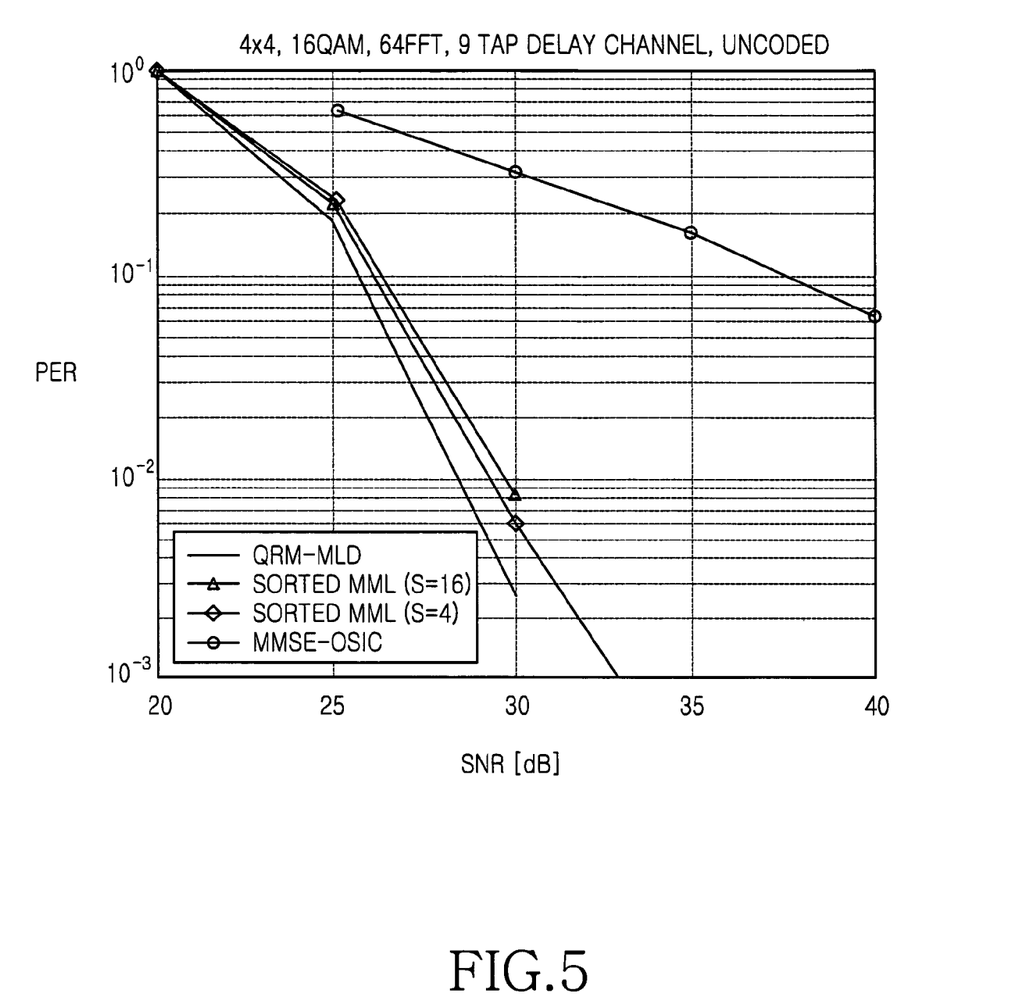
FIG. 5 is a graph illustrating the performance of a Sorted Modified Maximum Likelihood (SMML) according to the present invention.

FIG. 5 is a graph illustrating the performance of the SMML according to the present invention. Therein, it is assumed that the number of TX antennas is four, the number of RX antennas is four, and the OFDM system has 64 subcarriers. The TX channel environment is a 9 tap frequency selective channel. In addition, packet is 10240 bits (10 OFDM symbols), a 16QAM modulation scheme is used, a horizontal axis is a Signal to Noise Ratio (SNR), and a vertical axis is a Packet Error Rate (PER).

FIG. 5 shows PER when one packet is 10240 bits. QRM-MLD has almost the same performance as the ML. Therefore, the SMML method according to the present invention has performance similar to the QRM-MLD. While the ML has complexity of 0 ($M^{-N_T}$), the SMML method has complexity of 0 (M) and has performance difference of about 1 dB.

Table 1 shows complexities of MMSE-OSIC, SMML, and QRM-MLD illustrated in FIG. 5.

TABLE 1

| | | Complexity (single carrier, real) | |
|---|---|---|---|
| | | # of multiplier | |
| | # of divider | per frame | per symbol |
| MMSE-OSIC | 43 | 694 | 128 |
| SMML | 64 | 698 | 680 |
| QRM-MLD | 4 | 816 | 1632 |

Table 1 shows the number of real multipliers and the number of real dividers necessary per a single carrier in the 16QAM system having four TX antennas and four RX antennas.

As described above, the MIMO system using the spatial multiplexing scheme sorts the channels of the TX antennas, generates the subsystem, and performs the MML, thereby reducing the complexity. Thus, the receiver has the performance similar to the ML and can obtain the complexity similar to the SIC.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A signal detection apparatus in a wireless communication system, comprising:
   a channel sorter for sorting estimated channels of a received signal according to a scheme;
   a subsystem generator for generating a subsystem of a minimum unit by nulling a an arbitrary channel among the sorted channels;
   a Modified Maximum Likelihood (MML) calculator for performing an MML in the subsystem of the minimum unit to calculate a number of transmission signal vectors; and
   a transmission vector selector for selecting a transmission signal vector having a minimum Euclidean distance among the number of the calculated transmission signal vectors,
   wherein when the generated subsystem is not the subsystem of the minimum unit, the channel sorter resorts the channels of the generated subsystem.

2. The signal detection apparatus of claim 1, wherein the channel sorter sorts the channels in one of a descending and an ascending order by using vector norm of the channels.

3. The signal detection apparatus of claim 1, wherein the subsystem generator nulls the sorted channels in sequence from an uppermost channel by using a Givens rotation.

4. The signal detection apparatus of claim 3, wherein the Givens rotation nulls the channels using $$G_{IV}H_{IV} = \begin{bmatrix} h'_{1,3} & h'_{1,2} & h'_{1,4} & h'_{1,1} \\ 0 & h'_{2,2} & h'_{2,4} & h'_{2,1} \\ 0 & h'_{3,2} & h'_{3,4} & h'_{3,1} \\ 0 & h'_{4,2} & h'_{4,4} & h'_{4,1} \end{bmatrix}$$

where $G_{IV} = G_{IV,1}G_{IV,2}G_{IV,3}$, $$G_{IV,1} = \begin{bmatrix} 1 & 0 & 0 & 0 \\ 0 & 1 & 0 & 0 \\ 0 & 0 & c & s \\ 0 & 0 & -s^* & c \end{bmatrix},$$

$$G_{IV,2} = \begin{bmatrix} 1 & 0 & 0 & 0 \\ 0 & c & s & 0 \\ 0 & -s^* & c & 0 \\ 0 & 0 & 0 & 1 \end{bmatrix},$$

$$G_{IV,3} = \begin{bmatrix} c & s & 0 & 0 \\ -s^* & c & 0 & 0 \\ 0 & 0 & 1 & 0 \\ 0 & 0 & 0 & 1 \end{bmatrix},$$

$$H_{IV} = \begin{bmatrix} h_{1,3} & h_{1,2} & h_{1,4} & h_{1,1} \\ h_{2,3} & h_{2,2} & h_{2,4} & h_{2,1} \\ h_{3,3} & h_{3,2} & h_{3,4} & h_{3,1} \\ h_{4,3} & h_{4,2} & h_{4,4} & h_{4,1} \end{bmatrix},$$

$$c = \frac{|h_{3,3}|}{\sqrt{|h_{4,3}|^2 + |h_{3,3}|^2}},$$

$$s = \frac{h_{3,3}h_{4,3}^*}{|h_{3,3}|\sqrt{|h_{4,3}|^2 + |h_{3,3}|^2}},$$

$-s^*$ is the inverse complex conjugate of s, and element $h_{i,j}$ is a channel response between an $i^{th}$ reception antenna and a $j^{th}$ transmission (TX) antenna, in a 4×4 channel system.

5. The signal detection apparatus of claim 1, wherein the MML calculator calculates ordered pairs as many a number of modulation bits of a MIMO system by using the channels contained in the subsystem of the minimum unit, calculates Euclidean distances of the ordered pairs, selects a number of the ordered pairs in sequence from the ordered pair having a minimum Euclidean distance, and sequentially calculates the transmission signal vectors of the nulled channels by applying the ordered pairs to the MML.

6. The signal detection apparatus of claim 5, wherein the ordered pairs are calculated using slicing according to $$x_4 \in C, \; x_1 = Q\left(\frac{h_{II,1}^H}{\|h_{II,1}\|^2}(y_{II} - h_{II,4}x_4)\right)$$

where $x_4$ and $x_1$ represent the channels contained in the subsystem of the minimum unit, $h_{11}$ represents a channel of a 2×2 subsystem, and $y_{11}-h_{11,4}x_4$ represents removal of the $x_4$ channel.

7. The signal detection apparatus of claim 5, wherein the transmission signal vector is calculated using slicing according to $$x_{2,c} = Q\left(\frac{h_{III,2}^H}{\|h_{III,2}\|^2}\left(y_{III} - \sum_{j(i=1,4)} h_{III,i}x_{i,c}\right)\right)$$

-continued $$x_{3,c} = Q\left(\frac{h_{IV,3}^H}{\|h_{IV,3}\|^2}\left(y_{IV} - \sum_{j(i=1,2,4)} h_{IV,i}x_{i,c}\right)\right)$$

where $x_2$ is the nulled channel in a 3×3 subsystem, $x_3$ is the nulled channel in a 4×4 system, $h_{III}$ is a channel of the 3×3 subsystem, $y_{III}-h_{III,j}x_i$ represents removal of $x_i$ channel in the 3×3 subsystem, $h_{IV}$ represents the 4×4 system, and $y_{IV}-h_{IV,j}x_i$ represents removal of $x_i$ channel in the 4×4 system.

8. A signal detection method using both a descending sort and an ascending sort in a wireless communication system, comprising the steps of:

estimating channels of a received signal, and sorting the estimated channels by descending order to create a first transmission signal vector using a vector norm of the channels, and sorting the estimated channels by ascending order to create a second transmission signal vector using the vector norm of the channels;

generating a first N×N subsystem that is a minimum unit of a MIMO system, by nulling the sorted channels by the descending order to create the first transmission signal vector in sequence from an uppermost channel using a Givens rotation, and generating a second N×N subsystem by nulling the sorted channels by the ascending order to create the second transmission signal vector in sequence from an uppermost channel using the Givens rotation;

calculating at least one ordered pair about the first transmission signal vector and at least one ordered pair about the second transmission signal vector using the channels included in the first and second N×N subsystems, respectively;

selecting a first number of the ordered pairs about the first transmission signal vector and a second number of the ordered pairs about the second transmission signal vector in sequence from an ordered pair having a minimum Euclidean distance;

sequentially calculating the transmission signal vectors of the nulled channels in generating the first and second N×N subsystems from each of the selected ordered pairs using a slicing operation;

calculating a Euclidean distance for each of the calculated transmission signal vectors, and generating first and second transmission signal vectors having a minimum Euclidean distance from the first N×N subsystem and the second N×N subsystem, respectively; and comparing Euclidean distances of the first and second transmission signal vectors, and selecting a transmission signal vector having a smallest of the compared Euclidean distances.

9. The signal detection method of claim 8, when the subsystem generated through the nulling is not the subsystem of the minimum unit, further comprising:

resorting the channels of the generated subsystem of the first and second transmission signal vectors; and generating a subsystem of the first and second transmission signal vectors by nulling a channel having a best channel state and nulling a channel having a worse channel state among the resorted channels, respectively.

10. The signal detection method of claim 8, wherein the Givens rotation nulls the channels using $$G_{IV}H_{IV} = \begin{bmatrix} h'_{1,3} & h'_{1,2} & h'_{1,4} & h'_{1,1} \\ 0 & h'_{2,2} & h'_{2,4} & h'_{2,1} \\ 0 & h'_{3,2} & h'_{3,4} & h'_{3,1} \\ 0 & h'_{4,2} & h'_{4,4} & h'_{4,1} \end{bmatrix}$$

where $G_{IV} = G_{IV,1}G_{IV,2}G_{IV,3}$, $$G_{IV,1} = \begin{bmatrix} 1 & 0 & 0 & 0 \\ 0 & 1 & 0 & 0 \\ 0 & 0 & c & s \\ 0 & 0 & -s^* & c \end{bmatrix},$$

$$G_{IV,2} = \begin{bmatrix} 1 & 0 & 0 & 0 \\ 0 & c & s & 0 \\ 0 & -s^* & c & 0 \\ 0 & 0 & 0 & 1 \end{bmatrix},$$

$$G_{IV,3} = \begin{bmatrix} c & s & 0 & 0 \\ -s^* & c & 0 & 0 \\ 0 & 0 & 1 & 0 \\ 0 & 0 & 0 & 1 \end{bmatrix},$$

and $$H_{IV} = \begin{bmatrix} h_{1,3} & h_{1,2} & h_{1,4} & h_{1,1} \\ h_{2,3} & h_{2,2} & h_{2,4} & h_{2,1} \\ h_{3,3} & h_{3,2} & h_{3,4} & h_{3,1} \\ h_{4,3} & h_{4,2} & h_{4,4} & h_{4,1} \end{bmatrix},$$

$$c = \frac{|h_{3,3}|}{\sqrt{|h_{4,3}|^2 + |h_{3,3}|^2}},$$

$$s = \frac{h_{3,3}h_{4,3}^*}{|h_{3,3}|\sqrt{|h_{4,3}|^2 + |h_{3,3}|^2}},$$

$-s^*$ is the inverse complex conjugate of s, and element $h_{i,j}$ is a channel response between an $i^{th}$ reception antenna and a $j^{th}$ transmission (TX) antenna, in a 4×4 channel system.

11. The signal detection method of claim 8, wherein the ordered pairs are calculated using slicing according to $$x_4 \in C, x_1 = Q\left(\frac{h_{II,1}^H}{\|h_{II,1}\|^2}(y_{II} - h_{II,4}x_4)\right)$$

where $x_4$ and $x_1$ represent the channels contained in the subsystem of the minimum unit, $h_{II}$ represents a channel of a 2×2 subsystem, and $y_{II}-h_{II,4}x_4$ represents removal of the $x_4$ channel.

12. The signal detection method of claim 8, wherein the transmission signal vector is calculated using slicing according to $$x_{2,c} = Q\left(\frac{h_{III,2}^H}{\|h_{III,2}\|^2}\left(y_{III} - \sum_{j(i=1,4)} h_{III,i}x_{i,c}\right)\right)$$

-continued $$x_{3,c} = Q\left(\frac{h_{IV,3}^H}{\|h_{IV,3}\|^2}\left(y_{IV} - \sum_{j(i=1,2,4)} h_{IV,i}x_{i,c}\right)\right)$$

where $x_2$ is the nulled channel in a 3×3 subsystem, $x_3$ is the nulled channel in a 4×4 system, $h_{III}$ is a channel of the 3×3 subsystem, $y_{III} - h_{III,j}x_i$ represents removal of $x_i$ channel in the 3×3 subsystem, $h_{IV}$ represents the 4×4 system, and $y_{IV} - h_{IV,i}x_i$ represents removal of $x_i$ channel in the 4×4 system.

\* \* \* \* \*